Aug. 20, 1929.  M. M. MERRITT  1,724,954
METHOD FOR TREATING HIDES AND SKINS
Filed May 20, 1921
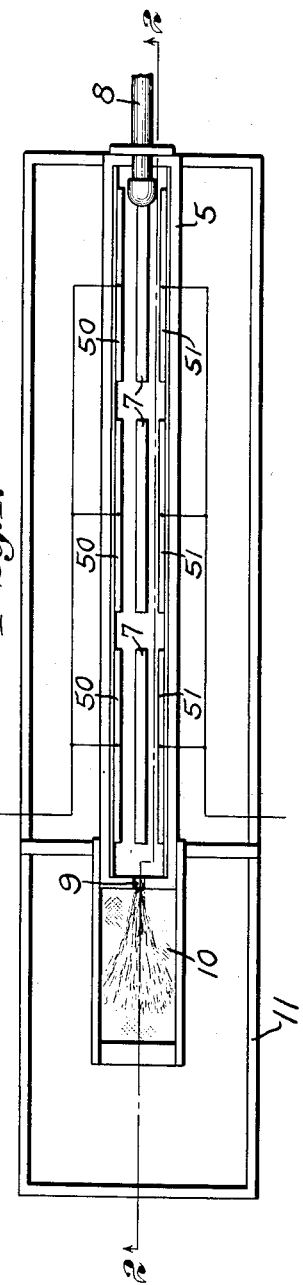
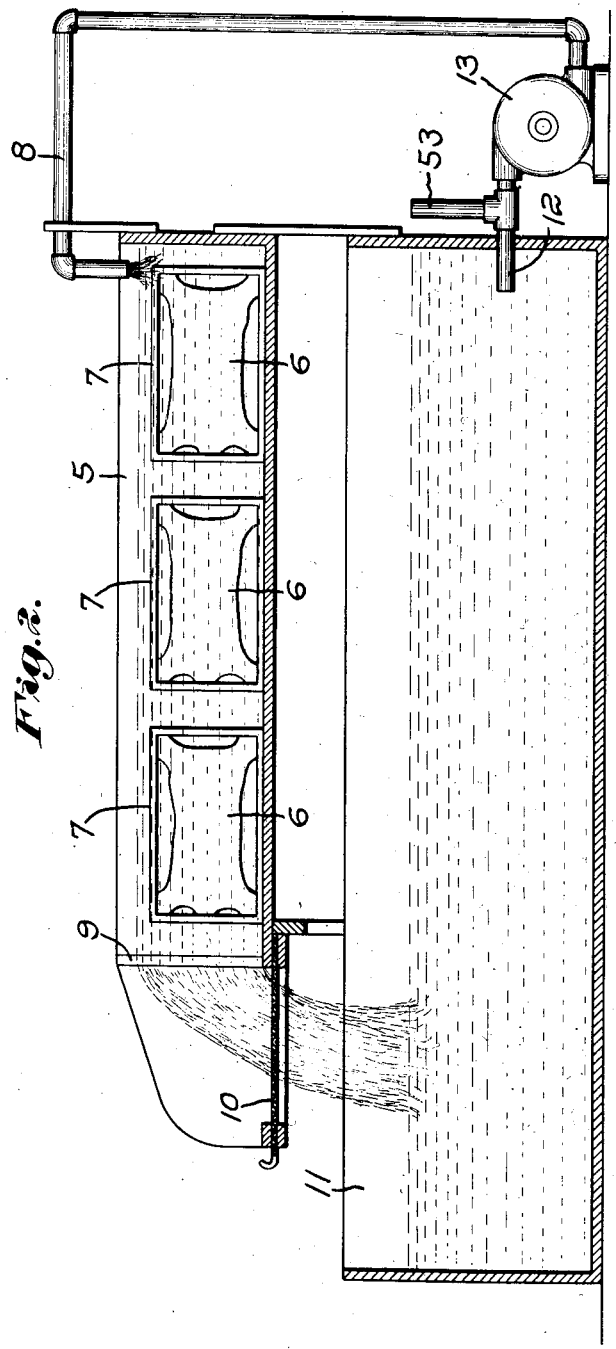
Inventor:
Matthew M. Merritt,
by Emery Booth Janney + Varney
Attys.

Patented Aug. 20, 1929.

1,724,954

UNITED STATES PATENT OFFICE.

MATTHEW M. MERRITT, OF SOUTH MIDDLETON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

METHOD FOR TREATING HIDES AND SKINS.

Application filed May 20, 1921. Serial No. 471,167.

This invention pertains to improvements in methods for treating materials, and more particularly, though not exclusively, to methods primarily useful in connection with the treatment of hides, skins and the like by liquid chemical agents.

It is among the objects of the invention to improve and to speed up the action of chemicals on hides, skins and the like in connection with such operations as depilating, cleansing and tanning.

With this end in view the invention contemplates passing a body of treating liquor in a rapid stream over the surfaces of the hides or skins undergoing treatment, thereby securing unusually rapid penetration of the treating liquor into the hides or skins and also insuring a high degree of uniformity in the strength of the treating liquor throughout the entire body thereof. Conveniently two bodies of treating liquor are provided in one of which the hides or skins are immersed while stretched upon frames and so disposed as to be parallel to the direction of flow of the stream of treating liquor whereby both surfaces of each of the skins or hides may be bathed most effectively by the stream of liquor which passes rapidly from the skins or hides into the second body of liquor where additions of chemical substances may be made to increase the strength of the treating liquor as desired, thus insuring uniform distribution of the added substances before any portion of this body of treating liquor again reaches the hides and skins undergoing treatment.

In another aspect the invention resides in an improved application of the electrolytic current in connection with the treatment of hides and skins in treating liquors. Because of the washing which the surfaces of the hides or skins receive during treatment by a rapidly flowing stream of liquor, whereby sediment and other impurities are removed as rapidly as formed, electrolysis of the treating liquor is especially effective in promoting the treatment of the hides and skins, the results being a marked improvement in the quality of skins or hides treated and a substantial reduction in the amount of time consumed in the treatment. During electrolytic action on the treating liquor each hide or skin undergoing treatment is positioned between and closely adjacent to cathode and anode plates and parallel to the plates so that the current passes through the hides or skins in a direction from side to side or from one surface to the other. In tanning operations on hides or skins the latter will be disposed preferably with the flesh surface closely adjacent to an anode plate, while in unhairing operations the hair side of the hide or skin will be disposed by preference closely adjacent to an anode plate. While the method of applying the electrolytic current is preferably that described above in conjunction with a rapidly flowing stream of treating liquor, it is to be understood that electrolysis of the treating liquor may conveniently be carried out according to the method described where the treating liquors are relatively stationary or agitated in another manner than that herein disclosed.

In the drawings, which illustrate an apparatus that may be utilized in the practice of the invention:

Figure 1 is a plan view of a form of apparatus primarily adapted to the treatment of hides; and Figure 2 is a section on the line 2—2 of Figure 1.

Referring to the drawings there is shown a relatively narrow tank or trough 5, having suspended longitudinally thereof in vertical planes hides or skins 6 stretched on frames 7. In the form of trough illustrated, the liquid carrying the chemicals for treating the hides is introduced by a pipe 8 at one end of the trough, the other end of the trough being provided with a relatively narrow outlet 9, preferably and as illustrated, extending the entire height of the trough. The liquid discharged from the outlet 9 is strained through a strainer 10, illustrated diagrammatically, and thence passes into a relatively large reservoir 11, which, as illustrated, is adapted to contain a very much larger amount of the hide-treating liquor than can be contained at any one time in the trough 5.

The reservoir or tank 11 is of considerable depth so that any foreign matter from the hides or from other sources which is lighter than the tanning liquor may float in the stratum at the top thereof, and so that any heavy foreign materials from any source may settle to the bottom thereof, leaving an opportunity for a considerable central stratum of chemical treating liquor comparative-free from foreign substances. From this central startum, in the preferred form of my invention illustrated, a supply conduit 12 leads the liquor to pumping apparatus exemplified by a centrifugal pump 13, which returns the liquor to the supply pipe 8 which discharges into the trough 5.

The pump 13 is of such capacity and operated at such speed as to keep the level of the liquid in the trough 5 above the tops of the skins therein being treated. The trough is so constructed that the liquid therein will flow longitudinally of the hides in a substantially unitary stream, no given portion of the liquor remaining in the trough 5 for a sufficient length of time to result in serious diminution, weakening, or adulteration of the chemical content thereof. The stream flows past the hides at such a rate as also to assist in cleansing the surfaces thereof, and so as to tend to drive the liquid into the pores or other openings in the skins. Circulation of the liquor at a rate of at least fifteen feet per minute to provide at least one hundred gallons of liquor per minute passing the surface of each hide is most satisfactory.

My improved apparatus hereinbefore described is particularly useful in connection with treatment of hides wherein electrolysis is utilized to speed up or assist or supplement the chemical action on the hide. To this end, I provide in the trough anode and cathode surfaces, these anodes and cathode surfaces preferably taking the form of carbon plates 50, 51 which are preferably at least as large as the skins to be treated, an anode being located on one side of each skin and a cathode on the opposite side of each skin.

In unhairing, I preferably locate the anode on the hair side of the skin, while in other cleaning or tanning operations I preferably locate the anode next to the inside or flesh surface of the skin, the cathode being on the opposite side of the skin from the anode.

The anode and cathode may be, as illustrated, equally spaced from the skin, but for some purposes I have found it preferable to locate the anode somewhat closer to the skin than the cathode.

Because of the fact that I supply a relatively large body of treating liquor in proportion to the body which is actually used at any one time, and also because of the straining and separation provisions of my apparatus, action of the liquor on the hide is not retarded by the presence of material once removed from the hide, and the deterioration or weakening of the treating liquor is very slow as compared with the usual rate of deterioration or weakening of the liquor. Such weakening of the liquor as takes place may be compensated for by the addition of appropriate chemical substances to the reservoir.

When the chemical content of the treating fluid is changed by the addition of chemicals or water, such change is effected not primarily in the same container wherein the hides are treated, but in a separate container so that a thorough mixing of the treating liquor is practicable before it comes in contact with the hides, thus preventing that damage to the hides which arises by the addition of chemicals to the liquor in which the hides are being treated, which is likely to stain or otherwise injure the hides. Each hide and each part of each hide being treated at any given time is subjected to exactly the same treatment and to the action of a liquor which is of substantially the same strength and consistency at all parts of the trough wherein the hides are being treated.

For the purpose of withdrawing relatively clean and representative material for testing purposes, or for taking the specific gravity thereof, I have provided a riser 53 in the conduit on the supply side of the pump 13. I will now describe the operation of the preferred form of apparatus illustrated and described.

The skins 6 are first stretched on the frames 7, which are then suspended in the trough 5. The pump 13 is then started and maintained in operation at such a speed that the liquor in the trough 5 will always cover the skins. The level of the liquor in the trough may be adjusted either by varying the speed of the pump or by varying the width of the discharge opening 9 from the trough 5.

Where electrolysis is used, the appropriate connections are then made to anode and cathode and the apparatus will continue to operate practically without any attention whatsoever.

The use of any portion of the liquor in active contact with the hide or hides for any considerable period at any one time being precluded, there will be at the most a very slow and at the same time a uniform weakening of the liquor, and the constant use of a relatively fresh and slowly changing supply will greatly improve and speed up the action of the chemicals on the hides.

The time factor may be varied by varying the strength of the chemical treating liquor. I have found that by utilization of the flowing stream, a stronger liquor may be used without injuring the hide than is the case where the usual practice is followed. I have also found that with any given chemical solution or mixture, hides treated by my method and apparatus are of superior quality and the desired operation is more quickly completed.

Where electrolysis is used, a much higher current density per square foot may be used in connection with my apparatus and method than may be used in connection with apparatus and methods wherein the treating liquor is still or is agitated by any of the means ordinarily practised.

Even where in connection with electrolysis, such current densities are used as to produce only the usual effect on the hide commonly supposed to include opening of the pores thereof and assistance of the ions of treating chemicals thereinto and therethrough, the use of the flowing stream is advantageous because the surface of the hide is constantly washed clean, the flow of the liquid assisting in the detachment of particles which should be detached, and the flow of liquid assisting in driving the chemicals into the pores or other openings of the hide. Where as in this arrangement a greater current density is used than could safely be used in connection with a still body of treating liquor, or in connection with treating liquor agitated by any usual means, a very great improvement in the treatment of the skin is effected, and the time necessary for completion of the treatment is greatly reduced.

While I have shown and described a preferred way of practising my improved method, it will be understood that changes in the apparatus and changes in the method described may be made without departing from the scope of my invention, which is best defined in the following claims.

Claims:

1. The method of tanning hides, skins, and the like, which comprises, stretching the hides or skins immersing them while in stretched condition in a treating liquor in a tank, maintaining them in stretched condition during immersion with the planes of the stretched hides or skins disposed parallel to an axis of the tank, and passing the tanning liquor through the tank as a stream flowing in a direction parallel to the surfaces of the hides or skins at a rate of fifteen feet per minute providing at least one hundred gallons per minute of liquor passing the surfaces of each skin.

2. The method of treating hides, skins and the like, which comprises, stretching the hides or skins, subjecting them while in stretched condition to the action of a relatively large body of treating liquor, circulating said liquor in a rapid stream past both surfaces of the hides using this body of liquor at any one time for only a relatively short period, and then passing it back to a main body of the liquor for a thorough admixture of its chemical content.

3. The method of treating hides, skins and the like which comprises, immersing them in a tanning liquor, washing the impurities from the hide or skin by maintaining a relatively rapid flow of the tanning fluid thereby, and passing a current of electricity from side to side through the skin to maintain the pores of the skin open by electrolysis and to assist in the penetration of the treating substances.

4. The method of treating hides, skins and the like which comprises, stretching the hides or skins, subjecting them while in stretched condition to the action of a stream of treating liquor flowing rapidly past both surfaces of the hides or skins, mixing the liquor when used with a body of stronger liquor to effect restoration of the used liquor to substantially its original strength, and continually supplying said flowing stream from said body of stronger liquor.

5. The method of treating hides, skins and the like which comprises, immersing them in a tanning liquor, washing the impurities from each hide or skin by maintaining a relatively rapid flow of the tanning liquor past both surfaces of the hide or skin, and passing a current of electricity from side to side through the hide or skin to maintain the pores of the hide or skin open by electrolysis and to assist in the penetration of the treating substances.

6. That improvement in methods of treating hides and skins which comprises, providing a moving body of treating liquor for the hides or skins, subjecting the treating liquor to the action of an electrolytic current passing from side to side through the body of treating liquor, and immersing each hide or skin in the moving body of treating liquor so that the hide or skin is acted upon by a constantly changing electrolytic treating liquor.

7. That improvement in method of tanning hides and skins which comprises, providing a tanning liquor for the hides or skins, subjecting the tanning liquor to the action of an electrolytic current passing between cathode and anode plates, and immersing each hide or skin in the tanning liquor with the flesh surface of the hide or skin disposed closely adjacent to an anode plate.

In testimony whereof, I have signed my name to this specification.

MATTHEW M. MERRITT.